US011574437B2

(12) United States Patent
Hou

(10) Patent No.: US 11,574,437 B2
(45) Date of Patent: Feb. 7, 2023

(54) SHADOW RENDERING METHOD AND APPARATUS, COMPUTER DEVICE, AND STORAGE MEDIUM

(71) Applicant: Tencent Technology (Shenzhen) Company Limited, Shenzhen (CN)

(72) Inventor: Cangjian Hou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 1 day.

(21) Appl. No.: 17/327,585

(22) Filed: May 21, 2021

(65) Prior Publication Data
US 2021/0279948 A1 Sep. 9, 2021

Related U.S. Application Data

(63) Continuation of application No. PCT/CN2020/079618, filed on Mar. 17, 2020.

(30) Foreign Application Priority Data

Apr. 11, 2019 (CN) .......................... 201910290577.3

(51) Int. Cl.
G06T 15/60 (2006.01)
G06T 15/04 (2011.01)
G06T 15/20 (2011.01)

(52) U.S. Cl.
CPC .............. G06T 15/60 (2013.01); G06T 15/04 (2013.01); G06T 15/20 (2013.01)

(58) Field of Classification Search
CPC ......... G06T 15/04; G06T 15/20; G06T 15/60; G06T 2215/12
See application file for complete search history.

(56) References Cited

U.S. PATENT DOCUMENTS

2002/0021302 A1 2/2002 Lengyel
2003/0156109 A1* 8/2003 Iwanaga ................ G06T 15/60
345/419

(Continued)

FOREIGN PATENT DOCUMENTS

CN 108830923 A 11/2018
CN 109993823 A 7/2019
JP 2016523401 A 8/2016

OTHER PUBLICATIONS

Everitt, Cass, Ashu Rege, and Cem Cebenoyan. "Hardware shadow mapping." White paper, nVIDIA 2 (2001). (Year: 2001).*

(Continued)

*Primary Examiner* — Daniel F Hajnik
(74) *Attorney, Agent, or Firm* — Morgan, Lewis & Bockius LLP

(57) ABSTRACT

This application discloses a shadow rendering method and apparatus, a computer device, and a storage medium, the method including: obtaining at least one rendering structure in a virtual scene according to an illumination direction in the virtual scene; obtaining model coordinates of a plurality of pixels according to a current viewing angle associated with the virtual scene and depth information of the plurality of pixels; sampling at least one shadow map according to the model coordinates of the plurality of pixels to obtain a plurality of sampling points corresponding to the plurality of pixels; and rendering the plurality of sampling points in the virtual scene to obtain at least one shadow associated with the at least one virtual object.

20 Claims, 5 Drawing Sheets

(56) References Cited

U.S. PATENT DOCUMENTS

| | | | |
|---|---|---|---|
| 2004/0179009 A1* | 9/2004 | Kii | G06T 15/405 |
| | | | 345/421 |
| 2008/0106549 A1 | 5/2008 | Newhall, Jr. et al. | |
| 2011/0069068 A1 | 3/2011 | Ha | |
| 2017/0178397 A1* | 6/2017 | Hillesland | G06T 15/04 |

OTHER PUBLICATIONS

Akenine-Moller, Thomas and Eric Haines. "Real-Time Rendering." 2nd ed. (2002), pp. 14-15, 18-19, and 118-120. (Year: 2002).*

Stamminger, Marc, and George Drettakis. "Perspective shadow maps." Proceedings of the 29th annual conference on Computer graphics and interactive techniques. 2002. (Year: 2002).*

Tencent Technology, WO, PCT/CN2020/079618, Jun. 24, 2020, 4 pgs.

Tencent Technology, IPOP, PCT/CN2020/079618, Sep. 28, 2021, 5 pgs.

Extended European Search Report, EP20787238.3 dated May 12, 2022, 10 pgs.

Lewis Hitchner et al., "Viewing and Projections", Lecture Notes, Jan. 1, 2005, pp. 1-60, The University of Auckland, XP055029637, 15 pgs., Retrieved from the Internet: https://www.cs.auckland.ac.nz/compsci372slc/venLectures/ViewingAndProjection4up.pdf.

Tencent Technology, ISR, PCT/CN2020/079618, dated Jun. 24, 2020, 2 pgs.

Tencent Technology, JP Office Action, Japanese Patent Application No. 2021-530180, dated Aug. 16, 2022, 6 pgs.

\* cited by examiner

SHADOW RENDERING METHOD AND APPARATUS, COMPUTER DEVICE, AND STORAGE MEDIUM

CROSS-REFERENCE TO RELATED APPLICATIONS

This application is a continuation application of PCI Patent Application No. PCT/CN2020/079618, entitled "SHADOW RENDERING METHOD AND APPARATUS, COMPUTER DEVICE AND STORAGE MEDIUM." filed on Mar. 17, 2020, which claims priority to Chinese Patent Application No. 201910290577.3, filed with the State Intellectual Property Office of the People's Republic of China on Apr. 11, 2019, and entitled "SHADOW RENDERING METHOD AND APPARATUS, TERMINAL, AND STORAGE MEDIUM", all of which are incorporated herein by reference in their entirety.

FIELD OF THE TECHNOLOGY

This application relates to the field of image rendering technologies, and in particular, to a shadow rendering method and apparatus, a computer device, and a storage medium.

BACKGROUND OF THE DISCLOSURE

With the development of image rendering technologies, to simulate a more realistic three-dimensional scene, a terminal usually renders a shadow of an object in the three-dimensional scene in real time. The object may be a character or an entity.

Currently, real-time shadow rendering may be implemented by using a third-party plug-in (for example, Fast Shadow Receiver). For example, according to light source data and a baked scene mesh, a mesh of a shadow region is obtained from the scene mesh, and shadow texture is rendered on the shadow region, to obtain a scene mesh with a shadow. Usually, "ghosting" (such as interspersed terrain and decals on the ground) occurs between the shadow directly rendered by the third-party plug-in and an original three-dimensional model in a scene, and the effect of shadow rendering is poor.

SUMMARY

Embodiments of this application provide a shadow rendering method and apparatus, a computer device, and a storage medium.

According to an aspect, a shadow rendering method is provided, performed by a computer device, the method including:

obtaining at least one rendering structure in a virtual scene according to an illumination direction in the virtual scene, the at least one rendering structure being used for rendering at least one shadow of at least one virtual object, and each rendering structure including a plurality of pixels in the virtual scene;

obtaining model coordinates of the plurality of pixels according to a current viewing angle associated with the virtual scene and depth information of the plurality of pixels, model coordinates being used for describing texture information of a pixel relative to a model vertex of a virtual object;

sampling at least one shadow map according to the model coordinates of the plurality of pixels to obtain a plurality of sampling points corresponding to the plurality of pixels, each shadow map being used for providing texture information of a shadow associated with the at least one virtual object; and rendering the plurality of sampling points in the virtual scene to obtain the at least one shadow.

According to an aspect, a shadow rendering apparatus is provided, including:

a first obtaining module, configured to obtain at least one rendering structure in a virtual scene according to an illumination direction in the virtual scene, the at least one rendering structure being used for rendering at least one shadow of at least one virtual object, and each rendering structure including a plurality of pixels in the virtual scene;

a second obtaining module, configured to obtain model coordinates of the plurality of pixels according to a current viewing angle associated with the virtual scene and depth information of the plurality of pixels, model coordinates being used for describing texture information of a pixel relative to a model base point of a virtual object;

a sampling module, configured to sample at least one shadow map according to the model coordinates of the plurality of pixels to obtain a plurality of sampling points corresponding to the plurality of pixels, each shadow map being used for providing texture information of a shadow associated with the at least one virtual object; and a rendering module, configured to render the plurality of sampling points in the virtual scene to obtain the at least one shadow.

According to an aspect, a computer device is provided, including a memory and a processor, the memory storing computer-readable instructions, and the computer-readable instructions, when executed by the processor, causing the processor to perform the operations of the shadow rendering method according to any one of the foregoing possible implementations.

According to an aspect, one or more non-transitory computer=readable storage media storing computer-readable instructions are provided, the computer-readable instructions, when executed by one or more processors, causing the one or more processors to perform the operations of the shadow rendering method according to any one of the foregoing possible implementations.

Details of one or more embodiments of this application are provided in the subsequent accompanying drawings and descriptions. Other features, objectives, and advantages of this application are illustrated in the specification, the accompanying drawings, and the claims.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

To make objectives, technical solutions, and advantages of this application clearer, the following further describes implementations of this application in detail with reference to the accompanying drawings.

Figure 1:
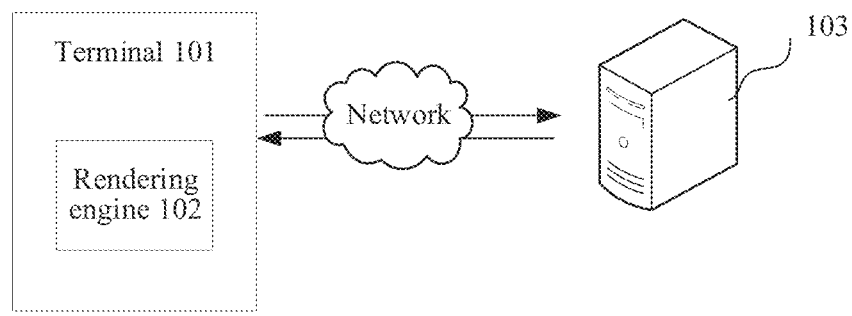
FIG. 1 is a schematic diagram showing an implementation environment of a shadow rendering method according to an embodiment of this application.

FIG. 1 is a schematic diagram showing an implementation environment of a shadow rendering method according to an embodiment of this application. Referring to FIG. 1, in this implementation environment, a rendering engine 102 may be installed on a terminal 101. The terminal 101 may obtain a virtual scene from a server 103 and display the virtual scene. The server 103 may be a game server, and the terminal 101 may obtain a game scene from the game server.

The terminal 101 is configured to provide shadow rendering services. The terminal 101 may render a virtual object in any virtual scene and a shadow of the virtual object based on the rendering engine 102. The virtual object may be a character or an entity. The virtual scene may be any virtual scene displayed on the terminal. For example, the virtual scene may be a game scene, an interior design simulation scene, or the like. Contents of the virtual scene are not specifically limited in the embodiments of this application.

In some embodiments, the rendering engine 102 may be installed on the terminal in the form of an independent rendering client, so that the terminal may directly implement shadow rendering through the rendering client. For example, the rendering engine 102 may be unity3D, Unreal Engine, or Open Graphics Library (OpenGL).

In some embodiments, an application client for providing virtual scenes may be installed on the terminal. The application client may be a game client, a three-dimensional design client, or the like. The rendering engine 102 may be encapsulated in a kernel layer of a terminal operating system in the form of an application programming interface (API). The terminal operating system provides the API to an upper-layer application client, so that the application client on the terminal may call the API to render a virtual object in a virtual scene and a shadow of the virtual object.

In the related art, the terminal performs shadow rendering based on a third-party plug-in (for example, Fast Shadow Receiver), and obtains a mesh of a shadow region according to a baked scene mesh. During the operation of the third-party plug-in, the scene mesh used usually occupies 1.5-4 MB of memory, which reduces memory resources of the terminal, thereby affecting the processing efficiency of the CPU in the terminal.

According to another aspect, because the scene mesh is usually embedded in a software development kit (SDK) of the application client, and the SDK occupies 5-10 MB of magnetic disk space, an installation package of the SDK of the application client has a larger size. For example, a baked 10 MB scene mesh usually increases the size of the installation package by 2 MB, which is not conducive to reducing the SDK size of the application client.

Figure 2:
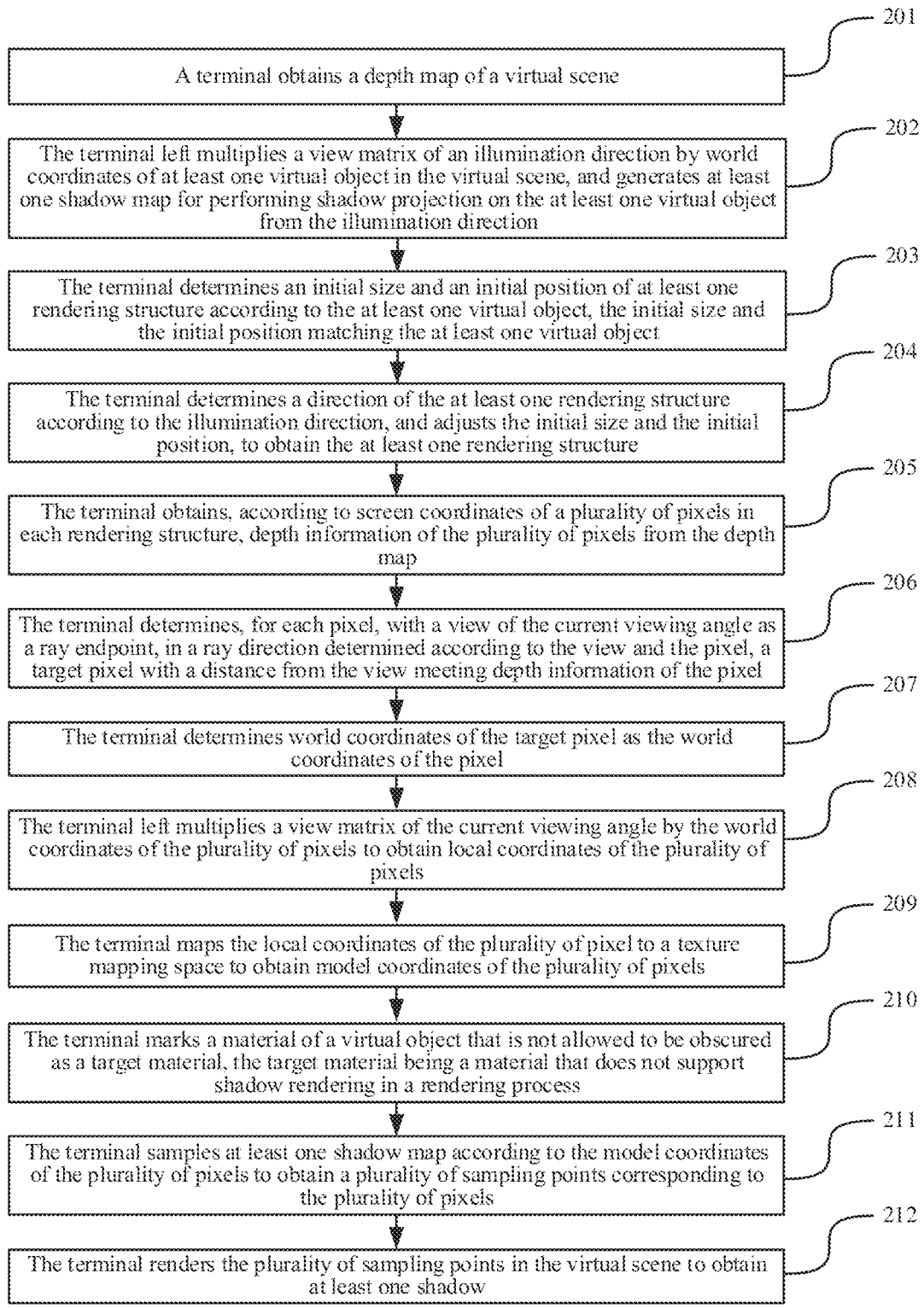
FIG. 2 is a flowchart of a shadow rendering method according to an embodiment of this application.

Based on the foregoing implementation environment, FIG. 2 is a flowchart of a shadow rendering method according to an embodiment of this application. Referring to FIG. 2, this embodiment may be applied to a terminal or an application client on the terminal. A terminal is used as an example in this embodiment of this application. The shadow rendering method includes the following steps:

201. A terminal obtains a depth map of a virtual scene.

The virtual scene may be any virtual scene displayed on the terminal. Data of the virtual scene may be stored locally or come from cloud. The virtual scene may include at least one virtual object, and at least one model is obtained by modeling the at least one virtual object, so that the at least one virtual object is displayed based on the at least one model. A model is used for representing a specific display form of a virtual object. The virtual object may be a character or an entity.

The depth map is used for representing depth information of the at least one virtual object in the virtual scene. The depth information is used for representing a front and rear position relationship of the at least one virtual object in a current viewing angle. For example, if the depth of character A is less than the depth of building B in a depth map of a virtual scene, a visual effect presented in the virtual scene is as follows: character A is in front of building B (that is, character A is closer to a current viewing angle).

In step 201, the terminal may obtain the depth map through a target buffer in a rendering engine. The target buffer usually stores a plurality of maps during rendering, such as light maps, depth maps, and normal maps, and "a plurality of" refers to at least two. Therefore, during the obtaining, the terminal may use a depth map identifier as an index and query according to the index in the target buffer. If the index can hit any map, the map is obtained as the depth map. For example, when the rendering engine is unity3D, the depth map may be obtained from the target buffer through Camera.SetTargetBuffers.

In some embodiments, in a real-time rendering scenario, the terminal first renders a virtual scene according to the depth map, and then renders shadows of virtual objects in the virtual scene. Therefore, after obtaining the depth map, the terminal may generate a depth map copy that is the same as the depth map based on the depth map. In subsequent steps 202-213, the depth map copy is directly accessed, which resolves the problem that the same depth map cannot be read and written at the same time during rendering. For example, the terminal may run the blit command on the depth map of the virtual scene in the BeforeForwardAlpha rendering stage of the virtual scene to obtain the depth map copy.

In some embodiments, the terminal may also directly store two same depth maps, so that the terminal accesses one of the depth maps when rendering the virtual scene, and accesses the other one when rendering the shadows in the virtual scene.

In some embodiments, the terminal may also obtain the depth map based on a depth obtaining interface embedded in the rendering engine. For example, when the rendering engine is unity3D, the depth map may be obtained by setting Camera.depthTextureMode to Depth.

202. The terminal left multiplies a view matrix of an illumination direction by world coordinates of at least one virtual object in the virtual scene, and generates at least one shadow map for performing shadow projection on the at least one virtual object from the illumination direction.

In some embodiments, rendering in the rendering engine usually involves coordinate transformation between a plurality of coordinate systems. The plurality of coordinate systems may include a model/object coordinate system, a world coordinate system, an eye/camera coordinate system, and a window/screen coordinate system. The model coordinate system is described in steps 208 and 209 in detail, and the screen coordinate system is described in step 205 in detail.

In some embodiments, the world coordinate system is a real coordinate system where the virtual scene is located. For a virtual scene, there is usually only one world coordinate system. The world coordinate system uses a scene base point of the virtual scene as a coordinate origin, and positions of pixels of each virtual object in the world coordinate system are referred to as world coordinates.

In some embodiments, the eye coordinate system is a coordinate system in which a user observes a virtual scene based on a current viewing angle. The eye coordinate system uses a view as a coordinate origin, and positions of pixels of each virtual object in the eye coordinate system are referred to as eye coordinates. Because the current viewing angle may be represented by a camera in a common rendering engine, the eye coordinate system may also be referred to as the camera coordinate system. The user observing the virtual scene based on the current viewing angle is equivalent to the user observing the virtual scene through a camera in the virtual scene. The camera is equivalent to a model of a special transparent virtual object.

Based on the foregoing descriptions, the current viewing angle may be represented by a camera in the rendering engine. Similarly, a light source may also be represented by a camera, so that the shadow map is equivalent to a map obtained by the light source after performing shadow projection on each virtual object in the virtual scene from the illumination direction. Because a light source camera is also equivalent to a model of a special transparent virtual object, a view matrix of the illumination direction is also a transformation matrix mapped from the world coordinate system to the model coordinate system of the light source.

In the foregoing process, the terminal directly left multiplies the view matrix of the illumination direction by the world coordinates of at least one virtual object in the virtual scene, transforms the at least one virtual object from the current viewing angle to a viewing angle of the illumination direction, and obtains a real-time image of the at least one virtual object from the viewing angle of the illumination direction as the at least one shadow map. Each shadow map corresponds to a virtual object and is used for providing texture (UV) information of a shadow of the virtual object.

In step 202, the terminal can directly obtain the shadow map under a light source viewing angle (light source camera) from a single camera of the current viewing angle based on the transformation of the view matrix, requiring no extra camera at the light source. This reduces the quantity of rendering cameras, shortens the rendering time of the terminal, and improves the rendering efficiency of the terminal.

In some embodiments, the terminal may mount (that is, configure) a secondary camera on a primary camera corresponding to the current viewing angle, and input the view matrix of the illumination direction to the secondary camera to output the shadow map. The secondary camera belongs to the primary camera, which can reduce the quantity of rendering cameras, shorten the rendering time of the terminal, and improve the rendering efficiency of the terminal. For example, the secondary camera may be CommandBuffer.

Certainly, in some embodiments, the terminal may either not perform the transformation of the view matrix. Instead, the terminal directly sets a new camera at the light source, and obtains the shadow map based on the new camera, thereby lessening the calculation workload during shadow rendering.

203. The terminal determines an initial size and an initial position of at least one rendering structure according to the at least one virtual object, the initial size and the initial position matching the at least one virtual object.

The at least one rendering structure is used for rendering at least one shadow of the at least one virtual object, each rendering structure corresponds to a shadow of a virtual object, and each rendering structure includes a plurality of pixels.

In some implementations, the at least one rendering structure may be a cube, a sphere, or a cylinder. In different rendering engines, different rendering structures may be used for performing shadow rendering on the same virtual scene. A shape of the rendering structure is not specifically limited in the embodiments of this application. For example, a cube is usually used as a rendering structure in unity3D.

In some implementations, the terminal may recognize a type of the virtual scene, so as to determine a rendering structure corresponding to the type according to the type of the virtual scene. For example, when the terminal recognizes that the virtual scene is a game scene, the rendering structure is determined as a cube.

In the foregoing process, the initial size and the initial position matching the at least one virtual object refers to the following case: For each virtual object, an area of a bottom surface of a rendering structure corresponding to the virtual object is greater than or equal to an area of a bottom surface of a model of the virtual object, and an initial position of the rendering structure is at a position that can coincide with the bottom surface of the model of the virtual object in both horizontal and vertical directions.

In the foregoing process, for each virtual object, the terminal may determine an initial size and an initial position according to the virtual object, and generate a rendering structure according to the initial size and the initial position. The foregoing process is repeated to obtain at least one rendering structure.

In some embodiments, when the rendering structure is a cube, for each virtual object, the terminal may determine a square that can exactly include the bottom surface of the model of the virtual object as a bottom face of the cube. Because six faces of the cube are the same, an initial size of each face of the cube can be determined. Further, a center of the bottom face of the cube and a center of the bottom surface of the virtual object are placed to coincide with each other, so that an initial position of the cube can be obtained. The center of the bottom face may refer to a geometric center of the bottom face or a geometric gravity center of the bottom face.

204. The terminal determines a direction of the at least one rendering structure according to the illumination direction, and adjusts the initial size and the initial position, to obtain the at least one rendering structure.

In the foregoing process, for each virtual object, the terminal may determine a direction of the rendering structure corresponding to the virtual object (that is, an orientation of the rendering structure) as the illumination direction, determine a plurality of tangents of the virtual object in the illumination direction, and determine a region enclosed by a plurality of intersections of the plurality of tangents and a shadow projection surface in the virtual scene as a shadow region. In this way, the rendering structure is translated from the initial position determined in step 203 to a position that can cover the shadow region, and the rendering structure is adjusted from the initial size to a size that can cover the shadow region. The "cover" herein refers to the case that any surface of the rendering structure overlaps the shadow region, or the rendering structure can include the shadow region inside the rendering structure.

Through step 204, the terminal can enable each rendering structure to cover the shadow region without affecting the shadow rendering effect, thereby reducing the quantity of pixels that need to be rendered in the rendering structure, and improving the rendering efficiency. Based on the foregoing examples, when an initial size of a rendering structure in a shape of a cube is adjusted, the cube is usually adjusted to a cuboid. A shape of the rendering structure after the adjustment is not specifically limited in the embodiments of this application.

The shadow projection surface may be any surface in the virtual scene that supports shadow projection. The shadow projection surface may be smooth or uneven. For example, the shadow projection surface may be a lawn, a wall surface, or a road surface.

In steps 203 and 204, the terminal max obtain at least one rendering structure in the virtual scene according to the illumination direction in the virtual scene. Because each rendering structure corresponds to a shadow of a virtual object, the process of rendering each rendering structure by the terminal is the process of rendering each shadow. The process of rendering the rendering structure may include the following two stages: a vertex shading stage and a pixel shading stage.

In the foregoing case, in the vertex shading stage, the terminal may store, in vertex data of each pixel of each rendering structure, a view position in the virtual scene and a ray direction determined according to the view and the pixel. Based on information stored in the vertex data, step 206 can be performed. In addition, the terminal may also perform step 205 in the pixel shading stage to obtain depth information of each pixel.

In some embodiments, the terminal may not perform step 204. That is, after determining the initial size and the initial position of the rendering structure according to the virtual object and determining the direction of the rendering structure according to the illumination direction, the terminal generates the rendering structure and directly performs step 206 without further adjusting the size and the position of the rendering structure, thereby simplifying the process of shadow rendering.

205. The terminal obtains, according to screen coordinates of a plurality of pixels in each rendering structure, depth information of the plurality of pixels from the depth map, screen coordinates being used for describing position information of a pixel relative to a screen base point of a terminal screen.

The screen coordinate system is a coordinate system Where a terminal screen displays the virtual scene. The screen coordinate system uses a screen base point of the terminal screen as a coordinate origin, and positions of pixels of each virtual object in the screen coordinate system are referred to as screen coordinates. The screen base point may be any point on the terminal screen. For example, the screen base point may be a point at an upper left corner of the screen. In some embodiments, usually the virtual scene is not completely displayed on the terminal screen, and a user may observe more virtual objects in the virtual scene by controlling translation or rotation of the current viewing angle.

In the foregoing process, each rendering structure may include a plurality of pixels. For each pixel in each rendering structure, the terminal may determine a point whose coordinates are consistent with screen coordinates of the pixel from the depth map according to the screen coordinates of the pixel, and determine depth information of the point as the depth information of the pixel. The foregoing process is repeated to obtain the depth information of the plurality of pixels in each rendering structure. When two depth maps are included on the terminal, the depth map accessed in step 205 may be the depth map copy in step 201.

206. The terminal determines, for each pixel, with a view of the current viewing angle as a ray endpoint, in a ray direction determined according to the view and the pixel, a target pixel with a distance from the view meeting depth information of the pixel.

In the vertex shading stage in step 204, the terminal may store the view position and the ray direction in the vertex data of each pixel. Therefore, in step 206, the terminal may directly access the vertex data of each pixel to obtain the view position and the ray direction. Because only one ray can be determined according to one endpoint and one direction, the terminal may determine one target pixel according to the depth information of the pixel in the ray direction with the view as a ray endpoint.

In some implementations, the terminal may not store the view position and the ray direction in the vertex data. Instead, the terminal stores only a view position in the vertex shading stage. In step 206, the view position is obtained from the vertex data, and the ray direction is determined according to a direction indicated by a line from the view position to the pixel position, so as to determine the target pixel. Details are not described herein again.

Figure 3:
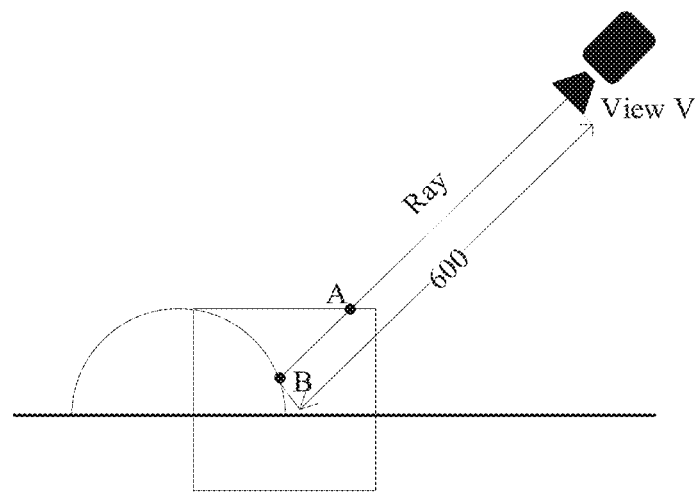
FIG. 3 is a schematic diagram of determining a target pixel according to an embodiment of this application.

FIG. 3 is a schematic diagram of determining a target pixel according to an embodiment of this application. As shown in FIG. 3, the rendering structure is a cube. FIG. 3 shows one face of the cube for illustration. Actually, the same can be done for any pixel in any face of the cube. Rendering the cube is to render the pixels on the surface of the cube. For any pixel A on the surface of the cube, a position of a view V and a ray direction may be obtained from vertex data of the pixel A. Therefore, only one ray VA can be determined according to coordinates of the pixel A, coordinates of the view V, and the ray direction. Assuming that a depth value of the pixel A obtained from the depth map in step 205 is 600, starting from the view V, pixel B with a depth of 600 from the view V may be determined on the ray VA. Because the depth value of the pixel A can represent a depth of a point on the surface of the cube relative to the inside of the cube, in steps 205 and 206, the target pixel B actually determined by the terminal is a pixel corresponding to the pixel A on the depth map (that is, a pixel corresponding to the pixel A on the virtual object).

In the foregoing process, the terminal can determine, based on the depth value of each pixel on the rendering structure, the target pixel corresponding to the pixel on the depth map, so that in step 210, the terminal can perform sampling according to model coordinates of each target pixel, and can map the shadow map to the rendering structure according to the model coordinates of the target pixel on the depth map. Therefore, the shadows of each virtual object may be rendered in real time in the virtual scene. Based on the foregoing examples, that is, in the stage of sampling and mapping the pixel A, the shadow map is sampled according to model coordinates of the pixel B, so that the rendered pixel A can present a visual effect of a shadow corresponding to the pixel B. The process of obtaining the model coordinates of the pixel B is described in detail in steps 207 to 209.

207. The terminal determines world coordinates of the target pixel as the world coordinates of the pixel.

World coordinates are used for describing position information of a pixel relative to a scene base point of the virtual scene.

In the foregoing process, the terminal determines the value of the target pixel in the world coordinate system as the world coordinates of the pixel of the rendering structure, and repeats steps 206 and 207 for a plurality of pixels of each rendering structure, so that the terminal can obtain the world coordinates of the plurality of pixels according to the current viewing angle and the depth information of the plurality of pixels.

208. The terminal left multiplies a view matrix of the current viewing angle by the world coordinates of the plurality of pixels to obtain local coordinates of the plurality of pixels, the view matrix being a transformation matrix mapped from the world coordinate system to the model coordinate system.

In some embodiments, the model coordinate system in the rendering engine is a coordinate system in which the virtual object is located in a three-dimensional model. For at least one virtual object in the virtual scene, a model of each virtual object has its own model coordinate system, and positions of pixels of each virtual object in the model coordinate system are referred to as model coordinates. In other words, there may be at least one model coordinate system in a virtual scene, and the quantity of model coordinate systems is equal to the quantity of virtual objects. The model coordinate system is an imaginary coordinate system with the center of each virtual object as the coordinate origin. Therefore, even though the virtual object changes dynamically, the relative position of the model coordinate system and the virtual object remains unchanged.

In the foregoing process, a local coordinate refers to a coordinate value of a pixel in a [−1,1] space of the model coordinate system. Because the view matrix of the current viewing angle is a transformation matrix mapped from the world coordinate system to the model coordinate system of at least one rendering structure, the view matrix of the current viewing angle is left multiplied by the world coordinates of the plurality of pixels to obtain the local coordinates of the plurality of pixels.

209. The terminal maps the local coordinates of the plurality of pixel to a texture mapping space to obtain the model coordinates of the plurality of pixels.

In the foregoing process, the terminal obtains the model coordinates of the plurality of pixels according to the world coordinates of the plurality of pixels. Model coordinates are used for describing texture information of a pixel relative to a model base point of a virtual object.

A model coordinate in step 209 refers to a coordinate value of a pixel in a [0,1] space of the model coordinate system. A value range of texture (UV) information of at least one shadow map obtained in step 202 is [0,1], and after the view matrix is left multiplied by the world coordinates of a plurality of pixels, the local coordinates in the value range of [−1,1] are actually obtained. Therefore, it is necessary to map the plurality of pixels from the local coordinates in the [−1,1] space to the model coordinates in the [0,1] space, so that the model coordinates in the [0,1] space can correspond one-to-one to the texture information in the shadow map to facilitate the sampling process in step 210.

In some embodiments, when the terminal maps the local coordinates of the plurality of pixels to a texture (UV) mapping space, the local coordinates of each pixel may be inputted to a transformation function to output the model coordinates of the plurality of pixels in the texture (UV) mapping space. The transformation function may be a function embedded in the rendering engine.

In steps 206 to 209, the terminal obtains the model coordinates of the plurality of pixels according to the current viewing angle and the depth information of the plurality of pixels, that is, the terminal obtains the world coordinates of the plurality of pixels, transforms the world coordinates of the plurality of pixels into the local coordinates of the plurality of pixels through the view matrix, and further maps the local coordinates of the plurality of pixels to the texture (UV) mapping space to obtain the model coordinates of the plurality of pixels.

210. The terminal marks a material of a virtual object that is not allowed to be obscured as a target material, the target material being a material that does not support shadow rendering in a rendering process.

Figure 4:
FIG. 4 is a schematic diagram of a rendering effect according to an embodiment of this application.

In some embodiments, if sampling and rendering are directly performed based on the model coordinates of the plurality of pixels, the rendered shadow obscures the body of the virtual object. For example, FIG. 4 is a schematic diagram of a rendering effect according to an embodiment of this application. Referring to FIG. 4, the shadow of the character in the figure obscures boots of the character, which affects the rendering effect of the virtual scene.

To prevent the shadow of the virtual object from obscuring the body of the virtual object, the terminal may step 210 to mark the material of the virtual object that is not allowed to be obscured as the target material. Because the target material is a material that does not support shadow rendering, in the rendering process of steps 211 and 212, any virtual object marked with the target material cannot be overlappingly rendered. This prevents the shadow from obscuring the virtual object, optimizes the rendering effect of the virtual scene, and improves the fidelity of shadow rendering. In the foregoing process, marking the material of the virtual object is merely making a mark. The material of the virtual object is not substantially changed.

In some embodiments, when the rendering engine is unity3D, the terminal may mark the material of the virtual object that is not allowed to be obscured based on a stencil buffer. For example, a Stencil Pass material of a virtual object that is allowed to be obscured on the shadow projection surface may be marked as Replace, and a Stencil Pass material of the virtual object that is not allowed to be obscured on the shadow projection surface may be marked as IncrSat. During shadow rendering, the terminal checks the material of the virtual object on which the shadow is projected. Sampling and drawing are performed only when Stencil is Comp Equal, thereby preventing the shadow from obscuring the virtual object, and optimizing the rendering effect of the virtual scene.

In some embodiments, the terminal may not perform step 210. After the model coordinates of the plurality of pixels are obtained, the terminal directly performs step 211 to sample at least one shadow map, thereby shortening the time of shadow rendering, and improving the efficiency of shadow rendering.

211. The terminal samples at least one shadow map according to the model coordinates of the plurality of pixels to obtain a plurality of sampling points corresponding to the plurality of pixels, each shadow map being used for providing texture information of a shadow associated with the at least one virtual object.

In the foregoing process, the terminal samples at least one shadow map obtained in step 202 according to the model coordinates of the plurality of pixels. The model coordinates of the plurality of pixels are in the [0,1] space, and texture information of each shadow map is also in the [0,1] space. Therefore, for the plurality of pixels in each rendering structure, the terminal can find a plurality of sampling points that correspond one-to-one with the plurality of pixels in the shadow map of the virtual object corresponding to the rendering structure.

The sampling process in step 211 is as follows: For each pixel, the terminal obtains a point corresponding to the model coordinates of the pixel as a sampling point, and repeats the sampling process for each rendering structure to obtain a plurality of sampling points of each rendering structure. For example, if model coordinates of a certain pixel are (0.5, 0.5), a point located at (0.5, 0.5) in the shadow map is determined as a sampling point of the pixel.

212. The terminal renders the plurality of sampling points in the virtual scene to obtain at least one shadow.

In the foregoing process, when performing rendering based on the plurality of sampling points, the terminal may call the embedded DrawCall to access a graphics processing unit (GPU) of the terminal to draw the plurality of sampling points, so as to obtain the at least one shadow.

In some embodiments, the terminal may not perform step 201. That is, the terminal does not obtain the at least one shadow map. Instead, the terminal directly stores one or more target shadow maps locally. Therefore, in steps 211 and 212, according to the model coordinates of the plurality of pixels, the one or more target shadow maps are sampled to obtain a plurality of sampling points corresponding to the plurality of pixels, and the plurality of sampling points are rendered in the virtual scene to obtain at least one shadow.

When there is one target shadow map, all rendering structures may sample the same target shadow map, so that all virtual objects have the same shadow. For example, the target shadow map may be a round piece. Certainly, when there are a plurality of target shadow maps, different rendering structures may sample different target shadow maps, so that different virtual objects have different shadows. For example, the target shadow maps include round pieces and square pieces, a rendering structure corresponding to a character samples a round piece, and a rendering structure corresponding to a building samples a square piece.

Figure 5:
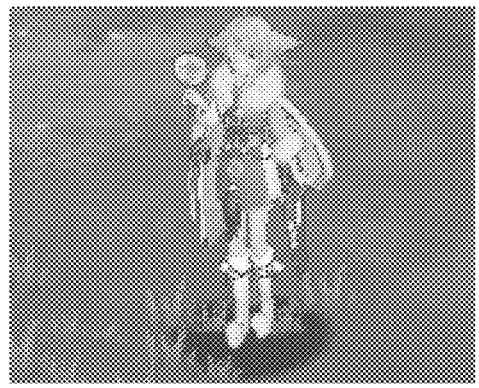
FIG. 5 is a schematic diagram of a rendering effect according to an embodiment of this application.

FIG. 5 is a schematic diagram of a rendering effect according to an embodiment of this application. Because the terminal marks the material in step 210, the hoots of the character in the figure are restored to be not obscured by the shadow.

Figure 6:
FIG. 6 is a schematic diagram of a rendering effect according to an embodiment of this application.

FIG. 6 is a schematic diagram of a rendering effect according to an embodiment of this application. Because the terminal performs the process of obtaining the shadow map in step 202, the rendered shadow is consistent with a contour of a virtual object. If a locally stored target shadow map is used, for example, if the target shadow map is a round piece, a contour of a rendered shadow is shown in FIG. 4.

In steps 201 to 212, the terminal can make full use of the function of the rendering engine to provide a shadow rendering method. The method does not require additional storage overheads, additional production overheads, or additional memory space during operation. In addition, the method features stable operation efficiency without being affected by movement of the virtual object, and strong scalability.

Any combination of the foregoing optional technical solutions may be used to form an optional embodiment of the present disclosure. Details are not described herein again.

In the method provided in the embodiments of this application, according to an illumination direction in a virtual scene, at least one rendering structure in the virtual scene is obtained, and by using the at least one rendering structure as a model of shadow rendering, according to a current viewing angle and depth information of a plurality of pixels, model coordinates of the plurality of pixels are obtained, so that the model coordinates correspond one-to-one with a texture (UV) mapping space of a shadow map. At least one shadow map is sampled according to the model coordinates of the plurality of pixels to obtain a plurality of sampling points corresponding to the plurality of pixels. The plurality of sampling points are rendered in the virtual scene to obtain at least one shadow. Therefore, the effect of shadow rendering is improved, real-time rendering of shadows may also be implemented based on the function of a rendering engine, and the processing efficiency of a terminal CPU is improved.

Further, the shadow map is directly obtained from a single camera of the current viewing angle through coordinate system transformation of the view matrix of the illumination direction, requiring no extra camera at the light source. This reduces the quantity of rendering cameras, shortens the rendering time of the terminal, and improves the rendering efficiency of the terminal.

Further, an initial size and an initial direction of at least one rendering structure are adjusted according to the illumination direction, which can enable each rendering structure to cover the shadow region without affecting the shadow rendering effect. This reduces the quantity of pixels that need to be rendered in the rendering structure, and improves the rendering efficiency.

Further, the depth information of the plurality of pixels is determined according to screen coordinates of the plurality of pixels. When the depth map is obtained, the depth map may be stored as a depth map copy that is the same as the depth map, and the depth map copy is directly accessed during subsequent rendering, thereby reducing the rendering load of the terminal.

Further, according to world coordinates of any pixel, local coordinates of the pixel are obtained, and then the local coordinates are mapped to the texture (UV) mapping space, to obtain model coordinates of the pixel. This facilitates sampling and drawing based on texture (UV) information of each shadow map.

Further, a material of a virtual object that is not allowed to be obscured is marked in advance, so that the terminal cannot overlappingly render any virtual object marked with the target material. This prevents the shadow from obscuring the virtual object, optimizes the rendering effect of the virtual scene, and improves the fidelity of shadow rendering.

It is to be understood that the steps in the embodiments of this application are not necessarily performed according to a sequence indicated by step numbers. Unless clearly specified in this specification, there is no strict sequence limitation on the execution of the steps, and the steps may be performed in another sequence. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

To further visually illustrate beneficial effects brought by the shadow rendering method provided in the foregoing embodiments of this application, Table 1 shows the shadow rendering efficiency of three solutions when 14 high-precision models in a static state are tested on the terminal.

TABLE 1

| Shadow rendering solution | Single frame duration (unit: ms) | FPS (frame rate) |
|---|---|---|
| Unity3D native solution | 42 | 24 |
| Fast Shadow Receiver | 37 | 27 |
| Technical solution provided in this application | 37 | 27 |

It can be learned from Table 1 that, the rendering engine unity3D native solution requires 42 ms to render a frame of shadow and frames per second (FPS, that is, frame rate) is 24. Both the technical solution provided in this application and the third-party plug-in (Fast Shadow Receiver) require 37 ms to render a frame of shadow and FPS is 27. Therefore, the technical solution provided in this application and Fast Shadow Receiver have the same efficiency of shadow rendering when the models are in a static state, but both have higher efficiency of shadow rendering than the unity3D native solution.

Further, Table 2 shows the efficiency of shadow rendering of the two solutions when the models are moving. In the dynamic pressure test shown in Table 2, IOC) round-piece shadows are used to move rapidly in the same virtual scene.

TABLE 2

| Shadow rendering solution | Single frame duration (unit: ms) | FPS (frame rate) |
|---|---|---|
| Fast Shadow Receiver | 40 | 25 |
| Technical solution provided in this application | 29 | 34 |

It can be learned from Table 2 that, when the models are moving, the technical solution provided in this application requires only 29 ms to render a frame of shadow and FPS is 34, and Fast Shadow Receiver requires 40 ms to render a frame of shadow and FPS is 25. Therefore, the technical solution provided in this application has higher efficiency of shadow rendering than Fast Shadow Receiver when the models are moving.

According to Table 1 and Table 2, considering the efficiency of shadow rendering of the models that are in a static state and moving, compared with Fast Shadow Receiver, the technical solution provided in this application further shortens the time spent in rendering a frame of shadow, increases the quantity of FPS of shadow, improves the efficiency of shadow rendering of the terminal, and further improves the processing efficiency of the terminal CPU without additional overheads and loads.

Figure 7:
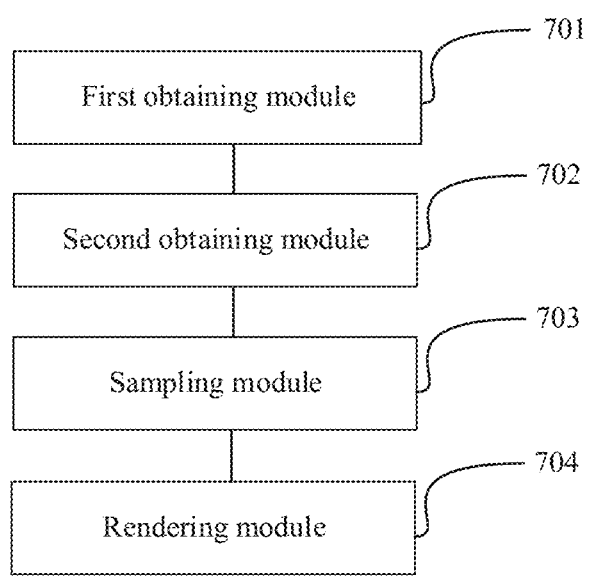
FIG. 7 is a schematic structural diagram of a shadow rendering apparatus according to an embodiment of this application.

FIG. 7 is a schematic structural diagram of a shadow rendering apparatus according to an embodiment of this application. The apparatus includes a first obtaining module 701, a second obtaining module 702, a sampling module 703, and a rendering module 704. The following describes the modules in detail.

The first obtaining module 701 is configured to obtain at least one rendering structure in a virtual scene according to an illumination direction in the virtual scene, the at least one rendering structure being used for rendering at least one shadow of at least one virtual object, and each rendering structure including a plurality of pixels in the virtual scene.

The second obtaining module 702 is configured to obtain model coordinates of the plurality of pixels according to a current viewing angle associated with the virtual scene and depth information of the plurality of pixels, model coordinates being used for describing texture information of a pixel relative to a model base point of a virtual object.

The sampling module 703 is configured to sample at least one shadow map according to the model coordinates of the plurality of pixels to obtain a plurality of sampling points corresponding to the plurality of pixels, each shadow map being used for providing texture information of a shadow associated with the at least one virtual object.

The rendering module 704 is configured to render the plurality of sampling points in the virtual scene to obtain the at least one shadow.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module Or unit.

In the apparatus provided in the embodiments of this application, according to an illumination direction in a virtual scene, at least one rendering structure in the virtual scene is obtained, and by using the at least one rendering structure as a model of shadow rendering, according to a current viewing angle associated with the virtual scene and depth information of a plurality of pixels, model coordinates of the plurality of pixels are obtained, so that the model coordinates correspond one-to-one with a texture (UV) mapping space of a shadow map. At least one shadow map is sampled according to the model coordinates of the plurality of pixels to obtain a plurality of sampling points corresponding to the plurality of pixels. The plurality of sampling points are rendered in the virtual scene to obtain at least one shadow. Therefore, real-time rendering of shadows may be implemented based on the function of a rendering engine, memory resources of the terminal are saved, and the processing efficiency of a terminal CPU is improved.

In one implementation, based on the apparatus composition of FIG. 7, the second obtaining module 702 includes:

a first obtaining unit, configured to obtain world coordinates of the plurality of pixels according to the current viewing angle and the depth information of the plurality of pixels, world coordinates being used for describing position information of a pixel relative to a scene base point of the virtual scene; and a second obtaining unit, configured to obtain model coordinates of the plurality of pixels according to the world coordinates of the plurality of pixels.

In one implementation, the first obtaining unit is configured to:

determine, for each pixel, with a view of the current viewing angle as a ray endpoint, in a ray direction determined according to the view and the pixel, a target pixel with a distance from the view meeting depth information of the pixel; and determine world coordinates of the target pixel as the world coordinates of the pixel.

In one implementation, the second obtaining unit is configured to:

left multiply a view matrix of the current viewing angle by the world coordinates of the plurality of pixels to obtain local coordinates of the plurality of pixels, the view matrix being a transformation matrix mapped from the world coordinate system to the model coordinate system; and map the local coordinates of the plurality of pixel to a texture mapping space to obtain the model coordinates of the plurality of pixels.

In one implementation, based on the apparatus composition of FIG. 7, the apparatus is further configured to:

obtain the depth information of the plurality of pixels from a depth map according to screen coordinates of the plurality of pixels, screen coordinates being used for describing position information of a pixel relative to a screen base point of a terminal screen.

In one implementation, the first obtaining module 701 is configured to:

determine an initial size and an initial position of the at least one rendering structure according to the at least one virtual object, the initial size and the initial position matching the at least one virtual object; and determine a direction of the at least one rendering structure according to the illumination direction, and adjust the initial size and the initial position, to obtain the at least one rendering structure.

In one implementation, the at least one rendering structure is a cube, a sphere, or a cylinder.

In one implementation, based on the apparatus composition of FIG. 7, the apparatus is further configured to:

left multiply a view matrix of the illumination direction by world coordinates of the at least one virtual object, and generate the at least one shadow map for performing shadow projection on the at least one virtual object from the illumination direction.

In one implementation, based on the apparatus composition of FIG. 7, the apparatus is further configured to:

mark a material of a virtual object that is not allowed to be obscured as a target material, the target material being a material that does not support shadow rendering in a rendering process.

When the shadow rendering apparatus provided in the foregoing embodiments renders shadows, the division of the foregoing functional modules is merely an example for description. In the practical application, the functions may be assigned to and completed by different functional modules according to the requirements, that is, the internal structure of the terminal is divided into different functional modules, to implement all or some of the functions described above. In addition, the shadow rendering apparatus provided in the foregoing embodiments and the shadow rendering method embodiments belong to one conception. For the specific implementation process, reference may be made to the shadow rendering method embodiments, and details are not described herein again.

Figure 8:
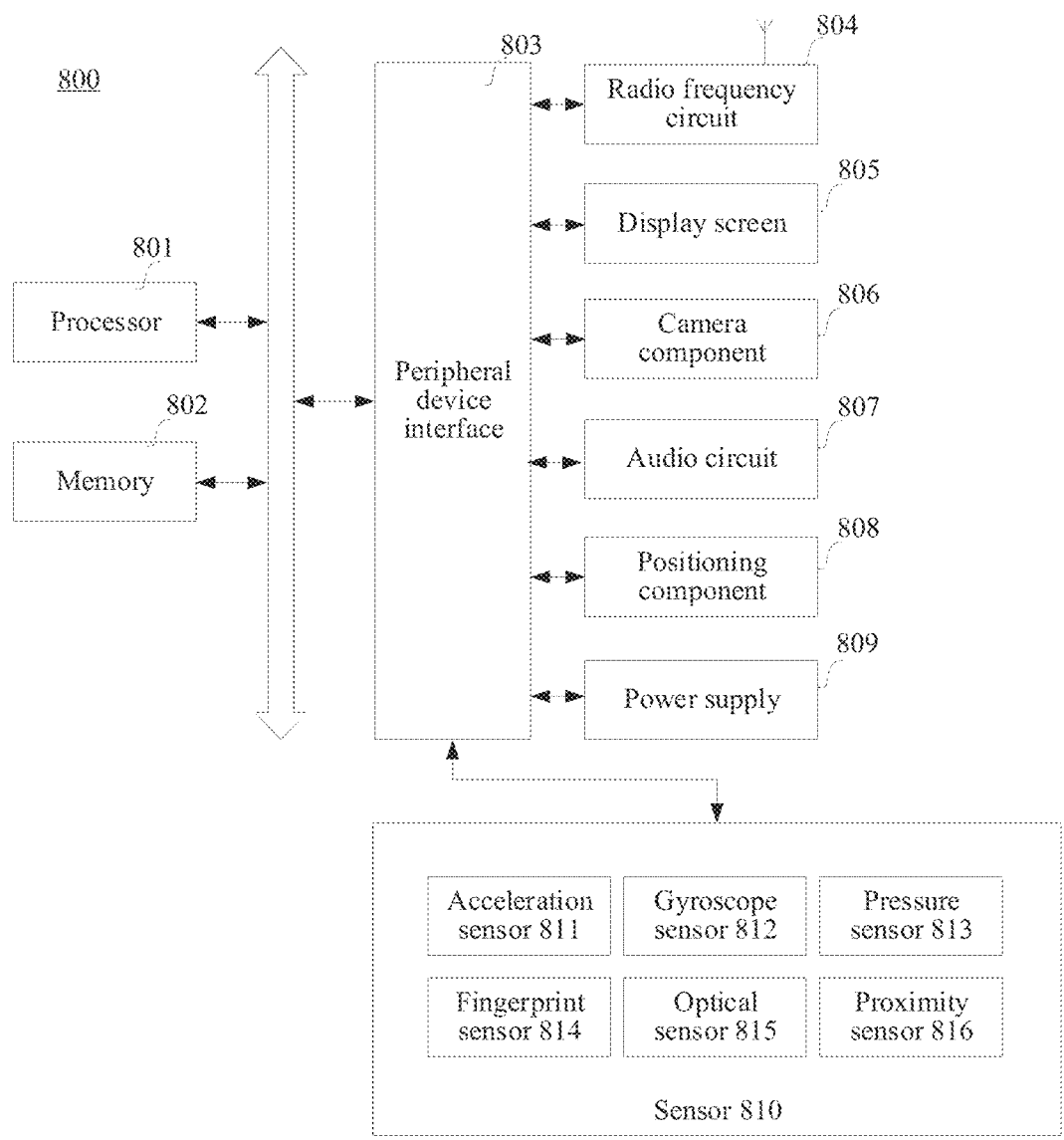
FIG. 8 is a schematic structural diagram of a terminal according to an embodiment of this application.

FIG. 8 is a schematic structural diagram of a terminal according to an embodiment of this application. The terminal 800 may be a smartphone, a tablet computer, a Moving Picture Experts Group Audio Layer III (MP3) player, a Moving Picture Experts Group Audio Layer IV (MP4) player, a notebook computer, or a desktop computer. The terminal 800 may also be referred to as user equipment, a portable terminal, a laptop terminal, a desktop terminal, or the like.

Generally, the terminal 800 includes a processor 801 and a memory 802.

The processor 801 may include one or more processing cores. For example, the processor 801 may be a 4-core processor or an 8-core processor. The processor 801 may be implemented in at least one hardware form of a digital signal processor (DSP), a field-programmable gate array (FPGA), and a programmable logic array (PLA). The processor 801 may also include a main processor and a coprocessor. The main processor is a processor configured to process data in an awake state, and is also referred to as a central processing unit (CPU). The coprocessor is a low-power processor configured to process data in a standby state. In some embodiments, a graphics processing unit (GPU) may be integrated with the processor 801. The GPU is configured to render and draw content to be displayed on a display screen. In some embodiments, the processor 801 may further include an artificial intelligence (AI) processor. The AI processor is configured to process a computing operation related to machine learning.

The memory 802 may include one or more computer-readable storage media. The computer-readable storage medium may be non-transient. The memory 802 may further include a high-speed random access memory, and a non-volatile memory such as one or more magnetic disk storage devices or flash storage devices. In some embodiments, the non-transitory computer-readable storage medium in the memory 802 is configured to store at least one instruction, and the at least one instruction is configured to be executed by the processor 801 to perform the shadow rendering method provided in the shadow rendering method embodiments of this application.

In some embodiments, the terminal 800 may optionally include a peripheral device interface 803 and at least one peripheral device. The processor 801, the memory 802, and the peripheral device interface 803 may be connected by a bus or a signal cable. Each peripheral device may be connected to the peripheral device interface 803 by a bus, a signal cable, or a circuit board. Specifically, the peripheral device includes at least one of a radio frequency circuit 804, a touch display screen 805, a camera 806, an audio circuit 807, a positioning component 808, and a power supply 809.

The peripheral device interface 803 may be configured to connect at least one peripheral device related to input/output (I/O) to the processor 801 and the memory 802. In some embodiments, the processor 801, the memory 802, and the peripheral device interface 803 are integrated on the same chip or circuit board. In some other embodiments, any one or two of the processor 801, the memory 802, and the peripheral device interface 803 may be implemented on a single chip or circuit board. This is not limited in this embodiment.

The radio frequency circuit 804 is configured to receive and transmit a radio frequency (RF) signal, which is also referred to as an electromagnetic signal. The radio frequency circuit 804 communicates with a communication network and other communication devices through the electromagnetic signal. The radio frequency circuit 804 converts an electrical signal into an electromagnetic signal for transmission, or converts a received electromagnetic signal into an electrical signal. In some implementations, the radio frequency circuit 804 includes: an antenna system, an RF transceiver, one or more amplifiers, a tuner, an oscillator, a digital signal processor, a codec chip set, a subscriber identity module card, and the like. The radio frequency circuit 804 may communicate with another terminal by using at least one wireless communication protocol. The wireless communication protocol includes, but is not limited to, a metropolitan area network, different generations of mobile communication networks (2G, 3G, 4G, and 5G), a wireless local area network, and/or a wireless fidelity (Wi-Fi) network. In some embodiments, the radio frequency circuit 804 may also include a circuit related to Near-Field Communication (NFC). This is not limited in this application.

The display screen 805 is configured to display a user interface (UI). The UI may include a graph, text, an icon, a video, and any combination thereof. When the display screen 805 is a touch display screen, the display screen 805 is further capable of collecting touch signals on or above a surface of the display screen 805. The touch signal may be inputted, as a control signal, to the processor 801 for processing. In this case, the display screen 805 may be further configured to provide a virtual button and/or a virtual keyboard, which is also referred to as a soft button and/or a soft keyboard. In some embodiments, there may be one display screen 805 disposed on a front panel of the terminal 800. In some other embodiments, there may be at least two display screens 805 disposed on different surfaces of the terminal 800 or designed in a foldable shape. In still some other embodiments, the display screen 805 may be a flexible display screen disposed on a curved surface or a folded surface of the terminal 800. Even, the display screen 805 may be further set to have a non-rectangular irregular shape, that is, a special-shaped screen. The display screen 805 may be made of materials such as a liquid crystal display (LCD), an organic light-emitting diode (OLED), or the like.

The camera component 806 is configured to capture images or videos. In some implementations, the camera component 806 includes a front-facing camera and a rear-facing camera. Generally, the front-facing camera is disposed on a front panel of the terminal, and the rear-facing camera is disposed on a rear surface of the terminal. In some embodiments, there are at least two rear-facing cameras, each being any one of a main camera, a depth of field camera, a wide-angle camera, and a telephoto camera, to implement a background blurring function through fusion of the main camera and the depth of field camera, panoramic photo shooting and virtual reality (VR) shooting through fusion of the main camera and wide-angle camera, or another fusion shooting function. In some embodiments, the camera component 806 may further include a flash. The flash may be a single-color-temperature flash, or may be a double-color-temperature flash. The double-color-temperature flash refers to a combination of a warm-light flash and a cold-light flash, and may be used for light compensation under different color temperatures.

The audio circuit 807 may include a microphone and a speaker. The microphone is configured to acquire sound waves of a user and an environment, and convert the sound waves into electrical signals and input the electrical signals into the processor 801 for processing, or input the electrical signals into the radio frequency circuit 804 to implement voice communication. For a purpose of stereo acquisition or noise reduction, there may be a plurality of microphones disposed at different portions of the terminal 800. The microphone may be further an array microphone or an omnidirectional microphone. The speaker is configured to convert electric signals from the processor 801 or the radio frequency circuit 804 into sound waves. The speaker may be a conventional thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 807 may also include an earphone jack.

The positioning component 808 is configured to determine a current geographic location of the terminal 800, to implement navigation or a location-based service (LBS). The positioning component 808 may be a positioning component based on the Global Positioning System (GPS) of the United States, the BeiDou system of China, the GLONASS System of Russia, or the GALILEO System of the European Union.

The power supply 809 is configured to supply power to components in the terminal 800. The power supply 809 max be an alternating-current power supply, a direct-current power supply, a disposable battery, or a rechargeable battery. In a case that the power supply 809 includes the rechargeable battery, the rechargeable battery may support wired charging or wireless charging. The rechargeable battery may be further configured to support a fast charge technology.

In some embodiments, the terminal 800 may further include one or more sensors 810. The one or more sensors 810 include, but are not limited to, an acceleration sensor 811, a gyroscope sensor 812, a pressure sensor 813, a fingerprint sensor 814, an optical sensor 815, and a proximity sensor 816.

The acceleration sensor 811 may detect acceleration on three coordinate axes of a coordinate system established by the terminal 800. For example, the acceleration sensor 811 may be configured to detect components of gravity acceleration on the three coordinate axes. The processor 801 may control, according to a gravity acceleration signal collected by the acceleration sensor 811, the touch display screen 805 to display the user interface in a frame view or a portrait view. The acceleration sensor 811 may be further configured to collect motion data of a game or a user.

The gyroscope sensor 812 may detect a body direction and a rotation angle of the terminal 800, and the gyroscope sensor 812 may work with the acceleration sensor 811 to collect a 3D action performed by the user on the terminal 800. The processor 801 may implement the following functions according to the data collected by the gyroscope sensor 812: motion sensing (for example, changing the UI according to a tilt operation of the user image stabilization during shooting, game control, and inertial navigation.

The pressure sensor 813 may be disposed at a side frame of the terminal 800 and/or a lower layer of the touch display screen 805. When the pressure sensor 813 is disposed at the side frame of the terminal 800, a holding signal of the user on the terminal 800 may be detected, and the processor 801 performs left/right hand recognition or a quick operation according to the holding signal collected by the pressure sensor 813. When the pressure sensor 813 is disposed at the lower layer of the touch display screen 805, the processor 801 controls an operable control on the UI interface according to a pressure operation performed by the user on the touch display screen 805. The operable control includes at least one of a button control, a scroll-bar control, an icon control, and a menu control.

The fingerprint sensor 814 is configured to collect a fingerprint of a user, and the processor 801 identifies the identity of the user according to the fingerprint collected by the fingerprint sensor 814, or the fingerprint sensor 814 identifies the identity of the user according to the collected fingerprint. When the identity of the user is identified as a trusted identity, the processor 801 authorizes the user to perform a related sensitive operation. The sensitive operation includes unlocking a screen, viewing encryption information, downloading software, payment, changing settings, and the like. The fingerprint sensor 814 may be disposed on a front surface, a rear surface, or a side surface of the terminal 800. When a physical button or a vendor logo is disposed on the terminal 800, the fingerprint sensor 814 may be integrated with the physical button or the vendor logo.

The optical sensor 815 is configured to collect ambient light intensity. In an embodiment, the processor 801 may control the display brightness of the touch display screen 805 according to the ambient light intensity collected by the optical sensor 815. Specifically, when the ambient light intensity is relatively high, the display brightness of the touch display screen 805 is increased. When the ambient light intensity is relatively low, the display brightness of the touch display screen 805 is decreased. In another embodiment, the processor 801 may further dynamically adjust shooting parameters of the camera component 806 according to the ambient light intensity collected by the optical sensor 815.

The proximity sensor 816, also referred to as a distance sensor, is usually disposed on a front panel of the terminal 800. The proximity sensor 816 is configured to collect a distance between a user and the front surface of the terminal 800. In an embodiment, when the proximity sensor 816 detects that the distance between the user and the front surface of the terminal 800 is gradually decreased, the processor 801 controls the touch display screen 805 to switch from a screen-on state to a screen-off state. When the proximity sensor 816 detects that the distance between the user and the front surface of the terminal 800 is gradually increased, the processor 801 controls the touch display screen 805 to switch from the screen-off state to the screen-on state.

A person skilled in the art may understand that the structure shown in FIG. 8 does not constitute a limitation to the terminal 800, and the terminal may include more or fewer components than those shown in the figure, or some components may be combined, or a different component arrangement may be used.

In an exemplary embodiment, a computer-readable storage medium, for example, a memory including instructions, is further provided. The instructions may be executed by the processor in the terminal to implement the shadow rendering method in the foregoing embodiments. For example, the computer-readable storage medium may be a read-only memory (ROM), a random access memory (RAM), a CD-ROM, a magnetic tape, a floppy disk, or an optical data storage device.

A person of ordinary skill in the art may understand that some or all procedures in the foregoing method embodiments may be implemented by a computer program instructing related hardware. The computer program may be stored in a non-volatile computer-readable storage medium, and when the computer program is executed, the procedures of the foregoing method embodiments may be performed. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The foregoing descriptions are merely exemplary embodiments of this application, but are not intended to limit this application. Any modification, equivalent replacement, or improvement made without departing from the spirit and principle of this application shall fail within the protection scope of this application.

What is claimed is:

1. A shadow rendering method, performed by a computer device, the method comprising:
   obtaining at least one rendering structure in a virtual scene according to an illumination direction in the virtual scene, the at least one rendering structure being used for rendering at least one shadow of at least one virtual object, and each rendering structure comprising a plurality of pixels in the virtual scene;
   obtaining depth information of the plurality of pixels from a depth map according to screen coordinates of the plurality of pixels, wherein the screen coordinates describe position information of a pixel relative to a screen base point of a terminal screen;
   obtaining model coordinates of the plurality of pixels according to a current viewing angle associated with the virtual scene and the depth information of the plurality of pixels, the model coordinates being used for describing texture information of the pixels relative to a model vertex of each virtual object, the model vertex having associated vertex data comprising coordinates of a view and a ray direction for a pixel on a surface of the rendering structure;
   sampling at least one shadow map according to the model coordinates of the plurality of pixels to obtain a plurality of sampling points corresponding to the plurality of pixels, each shadow map being used for providing texture information of a shadow associated with the at least one virtual object; and
   rendering the plurality of sampling points in the virtual scene to obtain the at least one shadow.

2. The method according to claim 1, wherein the obtaining model coordinates of the plurality of pixels according to a current viewing angle associated with the virtual scene and depth information of the plurality of pixels comprises:
   obtaining world coordinates of the plurality of pixels in the virtual scene according to the current viewing angle and the depth information of the plurality of pixels, the world coordinates being used for describing position information of the pixels relative to a scene base point of the virtual scene; and
   obtaining the model coordinates of the plurality of pixels according to the world coordinates of the plurality of pixels in the virtual scene.

3. The method according to claim 2, wherein the obtaining world coordinates of the plurality of pixels in the virtual scene according to the current viewing angle and the depth information of the plurality of pixels comprises:
   determining, for each pixel, with a view of the current viewing angle as a ray endpoint, in the ray direction determined according to the view and the pixel, a target pixel with a distance from the view meeting depth information of the pixel; and
   determining world coordinates of the target pixel in the virtual scene as the world coordinates of the pixel in the virtual scene.

4. The method according to claim 2, wherein the obtaining the model coordinates of the plurality of pixels according to the world coordinates of the plurality of pixels in the virtual scene comprises:
   left multiplying a view matrix of the current viewing angle by the world coordinates of the plurality of pixels to obtain local coordinates of the plurality of pixels in the virtual scene; and
   mapping the local coordinates of the plurality of pixel to a texture mapping space to obtain the model coordinates of the plurality of pixels.

5. The method according to claim 1, further comprising:
before obtaining model coordinates of the plurality of pixels according to a current viewing angle associated with the virtual scene and depth information of the plurality of pixels in the virtual scene, obtaining the depth information of the plurality of pixels from a depth map according to screen coordinates of the plurality of pixels, screen coordinates being used for describing position information of a pixel relative to a screen base point of a terminal screen.

6. The method according to claim 1, wherein the obtaining at least one rendering structure in a virtual scene according to an illumination direction in the virtual scene comprises:
determining an initial size and an initial position of the at least one rendering structure according to the at least one virtual object, the initial size and the initial position matching the at least one virtual object; and
determining a direction of the at least one rendering structure according to the illumination direction, and adjusting the initial size and the initial position, to obtain the at least one rendering structure.

7. The method according to claim 1, wherein the at least one rendering structure is a cube, a sphere, or a cylinder.

8. The method according to claim 1, further comprising:
before sampling at least one shadow map according to the model coordinates of the plurality of pixels to obtain a plurality of sampling points corresponding to the plurality of pixels, left multiplying a view matrix of the illumination direction by world coordinates of the at least one virtual object, and generating the at least one shadow map for performing shadow projection on the at least one virtual object from the illumination direction.

9. The method according to claim 1, further comprising:
marking a material of a virtual object that is not allowed to be obscured as a target material, the target material being a material that does not support shadow rendering in a rendering process.

10. A computer device, comprising a memory and a processor, the memory storing computer-readable instructions, and the computer-readable instructions, when executed by the processor, causing the processor to perform the following operations:
obtaining at least one rendering structure in a virtual scene according to an illumination direction in the virtual scene, the at least one rendering structure being used for rendering at least one shadow of at least one virtual object, and each rendering structure comprising a plurality of pixels in the virtual scene;
obtaining depth information of the plurality of pixels from a depth map according to screen coordinates of the plurality of pixels, wherein the screen coordinates describe position information of a pixel relative to a screen base point of a terminal screen;
obtaining model coordinates of the plurality of pixels according to a current viewing angle associated with the virtual scene and depth information of the plurality of pixels, the model coordinates being used for describing texture information of the pixels relative to a model vertex of each virtual object, the model vertex having associated vertex data comprising coordinates of a view and a ray direction for a pixel on a surface of the rendering structure;
sampling at least one shadow map according to the model coordinates of the plurality of pixels to obtain a plurality of sampling points corresponding to the plurality of pixels, each shadow map being used for providing texture information of a shadow associated with the at least one virtual object; and
rendering the plurality of sampling points in the virtual scene to obtain the at least one shadow.

11. The computer device according to claim 10, wherein the obtaining model coordinates of the plurality of pixels according to a current viewing angle associated with the virtual scene and depth information of the plurality of pixels comprises:
obtaining world coordinates of the plurality of pixels in the virtual scene according to the current viewing angle and the depth information of the plurality of pixels, the world coordinates being used for describing position information of the pixels relative to a scene base point of the virtual scene; and
obtaining the model coordinates of the plurality of pixels according to the world coordinates of the plurality of pixels in the virtual scene.

12. The computer device according to claim 11, wherein the obtaining world coordinates of the plurality of pixels in the virtual scene according to the current viewing angle and the depth information of the plurality of pixels comprises:
determining, for each pixel, with a view of the current viewing angle as a ray endpoint, in the ray direction determined according to the view and the pixel, a target pixel with a distance from the view meeting depth information of the pixel; and
determining world coordinates of the target pixel in the virtual scene as the world coordinates of the pixel in the virtual scene.

13. The computer device according to claim 11, wherein the obtaining the model coordinates of the plurality of pixels according to the world coordinates of the plurality of pixels in the virtual scene comprises:
left multiplying a view matrix of the current viewing angle by the world coordinates of the plurality of pixels to obtain local coordinates of the plurality of pixels in the virtual scene; and
mapping the local coordinates of the plurality of pixel to a texture mapping space to obtain the model coordinates of the plurality of pixels.

14. The computer device according to claim 10, wherein the plurality of operations further comprise:
before obtaining model coordinates of the plurality of pixels according to a current viewing angle associated with the virtual scene and depth information of the plurality of pixels in the virtual scene, obtaining the depth information of the plurality of pixels from a depth map according to screen coordinates of the plurality of pixels, screen coordinates being used for describing position information of a pixel relative to a screen base point of a terminal screen.

15. The computer device according to claim 10, wherein the obtaining at least one rendering structure in a virtual scene according to an illumination direction in the virtual scene comprises:
determining an initial size and an initial position of the at least one rendering structure according to the at least one virtual object, the initial size and the initial position matching the at least one virtual object; and
determining a direction of the at least one rendering structure according to the illumination direction, and adjusting the initial size and the initial position, to obtain the at least one rendering structure.

16. The computer device according to claim 10, wherein the plurality of operations further comprise:

before sampling at least one shadow map according to the model coordinates of the plurality of pixels to obtain a plurality of sampling points corresponding to the plurality of pixels, left multiplying a view matrix of the illumination direction by world coordinates of the at least one virtual object, and generating the at least one shadow map for performing shadow projection on the at least one virtual object from the illumination direction.

17. The computer device according to claim 10, wherein the plurality of operations further comprise:
marking a material of a virtual object that is not allowed to be obscured as a target material, the target material being a material that does not support shadow rendering in a rendering process.

18. One or more non-transitory computer-readable storage media storing computer-readable instructions, the computer-readable instructions, when executed by one or more processors of a computer device, causing the computer device to perform a plurality of operations including:
obtaining at least one rendering structure in a virtual scene according to an illumination direction in the virtual scene, the at least one rendering structure being used for rendering at least one shadow of at least one virtual object, and each rendering structure comprising a plurality of pixels in the virtual scene;
obtaining depth information of the plurality of pixels from a depth map according to screen coordinates of the plurality of pixels, wherein the screen coordinates describe position information of a pixel relative to a screen base point of a terminal screen;
obtaining model coordinates of the plurality of pixels according to a current viewing angle associated with the virtual scene and depth information of the plurality of pixels, the model coordinates being used for describing texture information of the pixels relative to a model vertex of each virtual object, the model vertex having associated vertex data comprising coordinates of a view and a ray direction for a pixel on a surface of the rendering structure;
sampling at least one shadow map according to the model coordinates of the plurality of pixels to obtain a plurality of sampling points corresponding to the plurality of pixels, each shadow map being used for providing texture information of a shadow associated with the at least one virtual object; and
rendering the plurality of sampling points in the virtual scene to obtain the at least one shadow.

19. The non-transitory computer-readable storage media according to claim 18, wherein the plurality of operations further comprise:
before obtaining model coordinates of the plurality of pixels according to a current viewing angle associated with the virtual scene and depth information of the plurality of pixels in the virtual scene, obtaining the depth information of the plurality of pixels from a depth map according to screen coordinates of the plurality of pixels, screen coordinates being used for describing position information of a pixel relative to a screen base point of a terminal screen.

20. The non-transitory computer-readable storage media according to claim 18, wherein the plurality of operations further comprise:
before sampling at least one shadow map according to the model coordinates of the plurality of pixels to obtain a plurality of sampling points corresponding to the plurality of pixels, left multiplying a view matrix of the illumination direction by world coordinates of the at least one virtual object, and generating the at least one shadow map for performing shadow projection on the at least one virtual object from the illumination direction.

* * * * *